(12) United States Patent
Walker et al.

(10) Patent No.: US 11,702,186 B2
(45) Date of Patent: Jul. 18, 2023

(54) COMPACT TRACK ARRANGEMENT FOR AERODYNAMIC SURFACES

(71) Applicant: THE BOEING COMPANY, Chicago, IL (US)

(72) Inventors: Steven P. Walker, Arlington, WA (US); Gregory M. Santini, Bothell, WA (US); Clayton Prow, Seattle, WA (US); Gary Wright, Seattle, WA (US)

(73) Assignee: The Boeing Company, Arlington, VA (US)

( * ) Notice: Subject to any disclaimer, the term of this patent is extended or adjusted under 35 U.S.C. 154(b) by 156 days.

(21) Appl. No.: 17/385,540

(22) Filed: Jul. 26, 2021

(65) Prior Publication Data

US 2023/0026667 A1 Jan. 26, 2023

(51) Int. Cl.
*B64C 9/24* (2006.01)
*B64C 9/22* (2006.01)
*B64C 13/34* (2006.01)
*B64C 9/02* (2006.01)

(52) U.S. Cl.
CPC .................. *B64C 9/24* (2013.01); *B64C 9/02* (2013.01); *B64C 9/22* (2013.01); *B64C 13/34* (2013.01)

(58) Field of Classification Search
CPC ..... B64C 9/02; B64C 9/16; B64C 9/18; B64C 9/20; B64C 9/22; B64C 9/24; B64C 9/26
See application file for complete search history.

(56) References Cited

U.S. PATENT DOCUMENTS

| | | | |
|---|---|---|---|
| 2017/0073082 A1* | 3/2017 | Ungar | B64C 9/22 |
| 2018/0086432 A1* | 3/2018 | Schlipf | B64C 13/341 |
| 2018/0162516 A1* | 6/2018 | Brown | F16H 49/001 |

* cited by examiner

*Primary Examiner* — Nicholas McFall
(74) *Attorney, Agent, or Firm* — Patterson + Sheridan, LLP

(57) ABSTRACT

Certain aspects of the present disclosure provide techniques for an aerodynamic surface actuation system, including: a plurality of outer tracks, wherein each outer track of the plurality of outer tracks includes: an inner outer roller channel; and an outer inner roller channel positioned above the inner outer roller channel; an aerodynamic surface connected to a carrier, wherein the carrier includes rollers configured to move within inboard inner roller channels of the plurality of outer tracks; and a plurality of fixed rollers mounted to one or more longitudinal structural elements in an aerodynamic structure, wherein the plurality of fixed rollers are disposed within the outer roller channels of the plurality of outer tracks.

20 Claims, 8 Drawing Sheets

COMPACT TRACK ARRANGEMENT FOR AERODYNAMIC SURFACES

FIELD

This disclosure relates generally to an actuation system for controlling the positioning of aerodynamic surfaces.

BACKGROUND

Conventional actuation systems for extending and retracting aerodynamic surfaces use single body tracks to extend and retract the surfaces. For example, leading edge slats of an aircraft are supported by the single body tracks when extended from a leading edge of a wing. Each single body track is disposed in the leading edge and connects the slat to the wing. However, the length required for the single body tracks to extend the slat is often greater than the space available inside the leading edge. Conventional systems use local penetrations in the wing spar to overcome this spatial issue. The penetrations allow the tracks to pass through the wing spar and into the main wing box cavity, which is on an aft side (or trailing edge side) of the wing spar. This is undesirable for several reasons.

First, the main wing box cavity may store fuel for the aircraft. Thus, to prevent the fuel from flowing through the penetrations and into the leading edge, the penetrations may be sealed with slat cans. The slat cans are configured to seal off the leading edge from the main wing box and surround the track when the track is retracted inside the main wing box. However, the seal around the slat cans may wear out over time, allowing fuel into the leading edge area. Second, the penetrations reduce the strength of the wing spar and require structural reinforcement of the spar surrounding the slat cans, which increases the weight of the aircraft and hardware necessary for building and maintaining the aircraft. Third, the slat can may be hard to manufacture and install because of dimensions of the slat can and limited space in the installation location. For example, the dimensions of the slat cans may interfere with surrounding features inside the main wing box. Thus, the slat can may contact the surrounding features causing damage to the features or the slat cans. In addition to the disruption of the spar structure, slat cans also are problematic for solving electrical isolation issues (EME) in carbon fiber wings.

Accordingly, there is a need for an aerodynamic surface actuation system that can fit entirely inside constrained spaces, such as inside a leading or trailing edge of an airplane wing, while maintaining the ability to fully extend and fully retract the aerodynamic surface.

SUMMARY

Certain embodiments provide an aerodynamic surface actuation system. The system comprises a plurality of outer tracks. Each outer track of the plurality of outer tracks comprises an inner outer roller channel and an outer inner roller channel positioned above the inner outer roller channel. The system further comprises an aerodynamic surface connected to a carrier, wherein the carrier comprises rollers configured to move within inboard inner roller channels of the plurality of outer tracks. The system further comprises a plurality of fixed rollers mounted to one or more longitudinal structural elements in an aerodynamic structure, wherein the plurality of fixed rollers are disposed within the outer roller channels of the plurality of outer tracks.

Other aspects provide a method of actuating an aerodynamic surface. The method comprises moving a plurality of outer tracks along a plurality of fixed rollers. Each outer track of the plurality of outer tracks comprises an outer roller channel and an inner roller channel positioned above the outer roller channel, and the plurality of fixed rollers are connected to one or more longitudinal structural elements in an aerodynamic structure and disposed within outer roller channels of the plurality of outer tracks. The method further comprises moving a carrier connected to an aerodynamic surface via rollers connected to the carrier and disposed within inner roller channels of the plurality of outer tracks.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
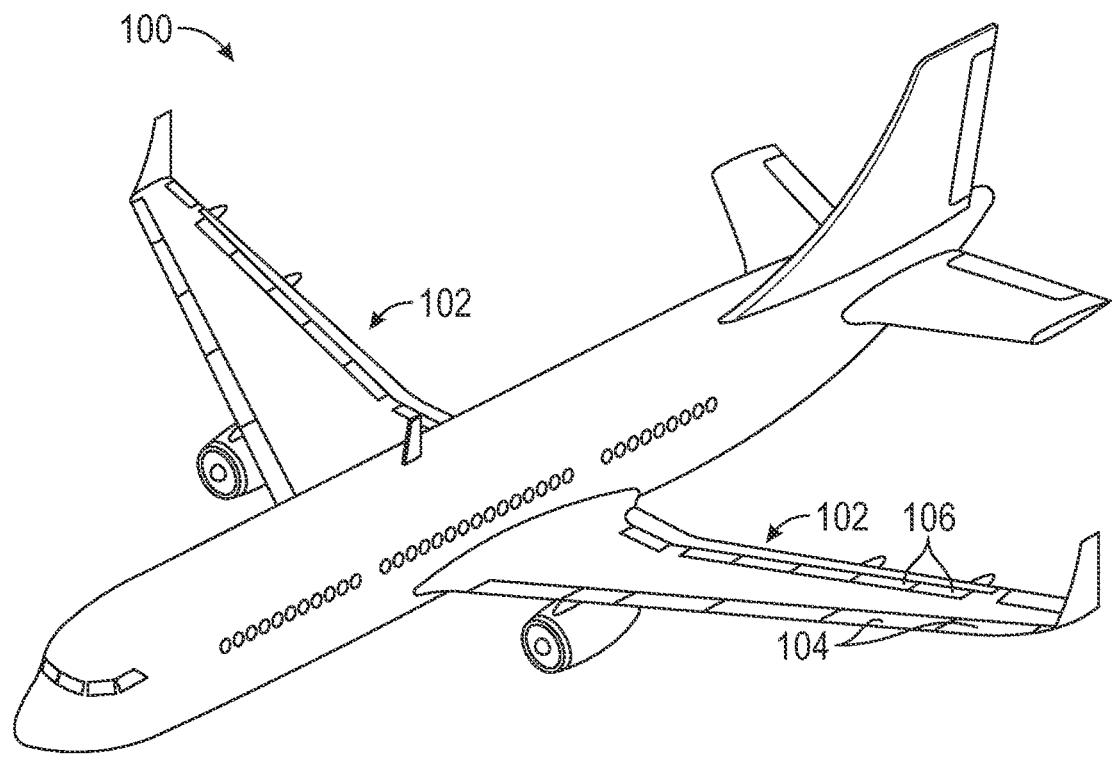
FIG. 1A depicts an aircraft with extendable aerodynamic surfaces, according to an example of the present disclosure.

Aspects of the present disclosure provide an aerodynamic surface actuation system that can fit entirely inside constrained spaces while maintaining the ability to fully extend and fully retract an aerodynamic surface to a plurality of operating positions.

According to one aspect, the surface actuation system connects to a leading edge slat of an airplane and is disposed inside a leading edge of a wing. The surface actuation system extends the leading edge slat forward and away from the wing to increase the camber of the wing and result in higher angles of attack of the wing. The higher angles of attack provide an increased lift for the aircraft at lower speeds, such as during take-off and landing. The surface actuation system also retracts the leading edge slat towards the wing to a fully retracted position when the higher angles of attack are not desired. Other aspects may instead control another aerodynamic surface, such as a trailing edge flap, or the like.

A shortcoming of conventional actuation systems is that they may not fit within the space available when fully retracted and thus require modification of surrounding structures. As an example of this, consider a conventional actuation system that uses a plurality of single body tracks to extend and retract the slats of a wing, such as depicted and described below with respect to FIG. 1B. Here, the single body tracks are disposed inside the leading edge of the wing and are typically have a length long enough to extend the slat a required distance away from the wing to maintain a desired camber of the wing. However, the space available inside the leading edge, between the slat and a wing spar, is limited and often shorter than the length of the single body track needed to extend the slat. Thus, the conventional, single body tracks must extend through the wing spar when the slats are in a fully retracted position, requiring penetrations in the wing spar for the single body tracks to extend through. Further, there may be a fuel tank on a side of the wing spar opposite the leading edge. The penetrations must be sealed and reduce the strength of the wing spar. Thus, additional seals and structural reinforcement are needed, increasing a complexity and a weight of the aircraft.

The surface actuation system described herein addresses these issues by actuating outer tracks with a rack and pinion system. The configuration of the outer tracks and the rack and pinion system allows the surface actuation system to fit within the space available inside the aircraft. For example, the surface actuation system fits inside the leading edge when the slat is in a fully retracted position without penetrating the wing spar. The outer tracks also extend the slat the required distance away from the wing to maintain the desired camber of the wing.

While leading edges and slats are discussed, they are only examples of an aerodynamic surface that can be used with the surface actuation system, and other aerodynamic surfaces are possible. For example, the aerodynamic surface activation systems described herein may similarly be configured to extend a flap from a trailing edge of the aircraft.

Example Vehicle with Extendable Surfaces

FIG. 1A depicts an aircraft 100 with extendable aerodynamic surfaces, according to an example of the present disclosure.

As shown, the aircraft 100 has two wings 102, each having leading edge slats 104 and trailing edge flaps 106. Slats 104 and flaps 106 may be extended from the wing 102 to increase a lift generated by the wing 102 when the aircraft 100 flies at lower airspeeds, such as during take-off and landing. An actuation system (not shown) is used to extend and retract the slats 104 and flaps 106 between fully extended and fully retracted positions, as well as other intermediate positions based on aircraft type and design. However, there is limited space available inside certain portions of the wing 102 for the actuation system as discussed in relation to FIG. 1B. Thus, an aerodynamic surface actuation system, as discussed in relation to FIGS. 2-5B, beneficially enables full articulation within the limited space without the disadvantages of conventional methods of penetrating wing spars.

Example Conventional System for Positioning Aerodynamic Surfaces

Figure 1B:
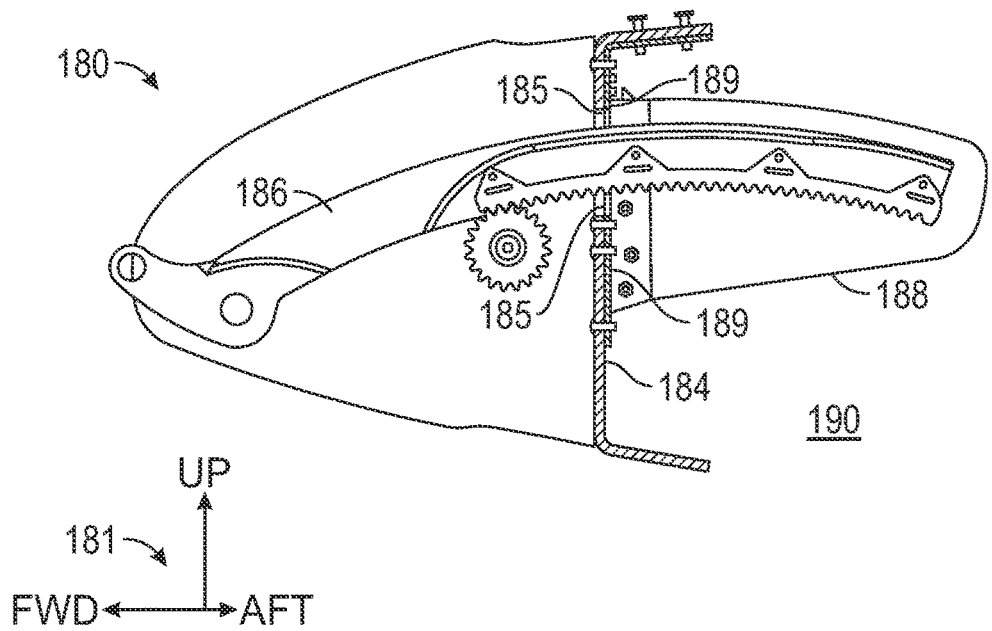
FIG. 1B depicts a side plan view of a conventional system for positioning aerodynamic surfaces.

FIG. 1B depicts a side plan view of a conventional system 180 for positioning aerodynamic surfaces. In particular, FIG. 1B shows the conventional system 180 in a fully retracted position.

The conventional system 180 is positioned in a leading edge of a wing 102 of the aircraft 100. A single body track 186 attaches to a slat (not shown) at a forward end of the single body track 186 in relation to a coordinate system 181. The single body track 186 has a length long enough to extend the slat a required distance away from the wing and is configured to extend the slat in the forward direction. The single body track 186 is also configured to retract the slat in the aft direction. As shown, when in the fully retracted position the single body track 186 extends through a penetration 185 in the spar 184 and into a main wing box cavity 190. The penetration 185 is required because the length of the single body track 186 is too long to fit in the leading edge of the wing 102.

Although not shown, the main wing box cavity 190 may contain fuel and thus the penetration 185 is sealed using a slat can 188. The slat can 188 sealably connects to the spar 184 and extends in an aft direction into the main wing box cavity 190. The slat can 188 further covers an aft portion of the single body track 186 and allows the single body track 186 to extend into the main wing box cavity 190 without contacting the fuel. The spar 184 includes a structural reinforcement 189 in an area surrounding the slat can 188, which reinforces the spar 184 to compensate for the strength lost from the penetration 185. The conventional system 180 further includes a seal (not shown) disposed between the spar 184 and the slat can 188 configured to prevent fuel from intruding into the slat can 188 or the leading edge.

As is clear from the example in FIG. 1B, having the single body track 186 extend into the wing box cavity 190 necessitates many additional structures that add complexity to manufacture and maintenance, as well as additional weight for the reinforcement structures. Further yet, slat can 188 may reduce the effective volume for fuel storage in wing box 190. The systems described herein resolve all of these challenges.

Example System for Positioning an Aerodynamic Surface

Figure 2:
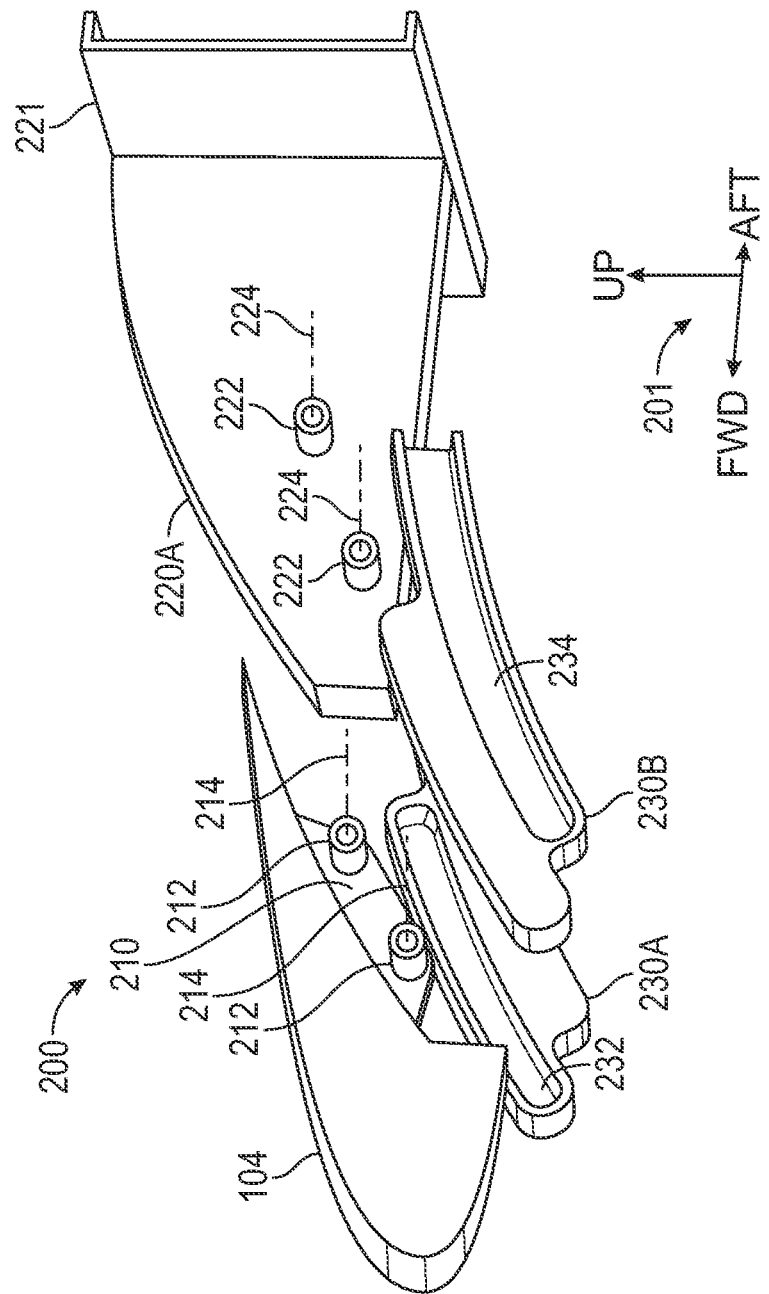
FIG. 2 depicts an exploded isometric view of an aerodynamic surface actuation system, according to an example of the present disclosure.

FIG. 2 depicts an exploded isometric view of an aerodynamic surface actuation system 200, according to another example of the present disclosure. In particular, FIG. 2 shows how the aerodynamic surface actuation system 200 (referred to as the system 200) attaches to the aircraft 100 (previously discussed in relation to FIG. 1).

The system 200 comprises a plurality of outer tracks 230, a carrier 210, an aerodynamic surface, and a plurality of different rollers. The system 200 attaches to the aircraft 100 via longitudinal structural elements of an aerodynamic structure. The aerodynamic structure comprises the wing 102 of the aircraft 100 as previously discussed in relation to FIG. 1A, and the longitudinal structural elements comprise ribs (e.g., a first rib 220A) within the wing 102. For example, each rib 220 is mounted to a wing spar 221 that runs a length of the wing 102 and is generally perpendicular to the ribs

220. A first rib 220A is shown for illustrative purposes, but the system 200 interfaces with a second rib 220B (as shown in FIG. 4) that mirrors the first rib 220A as discussed in relation to FIGS. 3C and 4.

The plurality of outer tracks 230 provide a compact track arrangement for extending or retracting an aerodynamic surface. In the depicted embodiment, the aerodynamic surface comprises a slat 104 and the plurality of outer tracks 230 includes outer tracks 230A and 230B (referred to as outer tracks 230). Generally, the outer tracks 230 provide a controllable movement of the aerodynamic surface between a plurality of positions, such as may be commanded by an aircraft control system. In particular, the outer tracks 230 provide an actuation system to extend or retract an aerodynamic surface (e.g., the slat 104) between various positions (as discussed in relation to FIGS. 4A and 4B). Each outer track 230A and 230B comprises an inner roller channel 232 and an outer roller channel 234, where the inner roller channel 232 is positioned above the outer roller channel 234 (referred to as an over-under configuration) in the depicted embodiment. The outer tracks 230 are used to extend and retract (generally referred to as actuating or positioning) the slat 104. The stacked (over-under in this example) configuration of the channels 232 and 234 beneficially allows the system 200 to actuate the slat 104 to a fully extended position with a shorter track (e.g., the outer tracks 230) than the single body tracks 186 of the conventional system 180 discussed in relation to FIG. 1B. For example, the stacked configuration allows the channels 232 and 234 to be nested such that they overlap (e.g., the outer roller channel 232 is above the inner roller channel 234) for at least a portion of the outer tracks 230.

The slat 104 connects to a carrier 210 that includes rollers 212, some of which are hidden from view behind the carrier 210 in FIG. 2. The carrier 210 is disposed between the outer tracks 230A and 230B. The rollers 212 are configured to move within the inner roller channels 232 of the outer tracks 230. Each roller 212 is further configured to rotate about an axis of rotation 214 as it moves through an inner roller channel 232, which allows the slat 104 to extend and retract smoothly. Thus, the carrier 210 provides a mechanism for the slat 104 to engage the outer tracks 230.

The ribs 220 further include a plurality of fixed rollers 222 (referred to as fixed rollers 222) mounted to the ribs 220. The fixed rollers 222 are disposed in the inner roller channels 232 of the outer tracks 230 and are configured to move through the outer roller channels 234 when the outer tracks 230 are actuated. Each fixed roller 222 is further configured to rotate about an axis of rotation 224 as it moves through an outer roller channel 234, which allows the slat 104 to extend and retract smoothly.

In some embodiments, the carrier 210 and the slat 104 are a unitary body. In some embodiments, the carrier 210 is permanently or removably attached to the slat 104. This beneficially allows the carrier 210 to comprise a different material than the slat 104. For example, the carrier 210 may comprise a steel and the slat 104 may comprise aluminum or an aluminum alloy, which is lighter than steel. In some embodiments, the carrier 210 attaches to a slat 104 as discussed in relation to FIG. 3C.

Although the aerodynamic surface is shown as a slat, other embodiments may use a flap, such as a trailing edge flap of the wing. Thus, any reference to the slat 104 may also be a reference to a more general aerodynamic surface. The slat 104 is shown as having a limited width (e.g., as shown in a direction coming out of the page) for illustrative purposes and may be much wider as shown with respect to FIG. 1.

In some embodiments, the outer tracks 230 comprise a metal, such as a high-strength steel. In some embodiments, the rollers 212 and 222 also comprise high-strength steel. For example, the rollers 212 and 222 may be made of steel or have a steel coating where the rollers 212 and 222 interface with the channels 232 and 234 of the outer tracks 230. Alternatively, the rollers 212 and 222 may comprise other materials (e.g., titanium and the like) and coatings (e.g., chrome, electroless nickel with boron nitride, and hard face coatings such as tungsten-carbide cobalt and the like). In some embodiments, the rollers comprise additional components to help rotation such as bearings and the like. As shown, the rollers 212 and 222 are mounted to the carrier 210 and the first rib 220A, respectively, but may be mounted by other means such as on posts that protrude from the carrier or the first rib 220A.

In some embodiments, the stacked configuration of the outer tracks 230 may be reversed. For example, the inner roller channel 232 may be positioned below the outer roller channel 234. The carrier 210 and the rollers 212 may be configured differently to accommodate the lowered position of the inner roller channels (referred to as lowered inner roller channels). The carrier may extend further away from the slat 104 to allow the rollers 212 to move in the lowered inner roller channels. The fixed rollers 222 of the ribs 220 may be configured differently to accommodate the raised location of the outer roller channels (referred to as raised outer roller channels). The rollers 222 may be positioned in a different location on the ribs 220 to allow the rollers 222 to move in the raised outer roller channels.

The stacked configuration of the channels 232 and 234 of the outer tracks 230 beneficially allows for a thinner outer track 230 than tracks having channels with a side-by-side configuration. For example, when the slat 104 is extended (as described in relation to FIGS. 3A and 3B), air may flow under the slat 104, up in relation to the coordinate system 201, between and around the outer tracks 230, and over the wing 102 (as discussed in relation to FIG. 1A) in an aft direction. The stacked configuration of the outer tracks 230 has a smaller cross-section to the airflow, which beneficially allows more air to flow through openings between the ribs 220 (only one is shown) and the slats 104 than a side-by-side configuration. The air flows through the openings from an underside of the wing 102, which is at a higher pressure than air at a top of the wing 102, and adds energy to the air flowing over the top of the wing 102. The increased energy allows air flowing over the top of the wing 102 to stay attached to the wing 102 longer at a higher angle of attack and increase the lift of the wing 102.

Figure 3A:
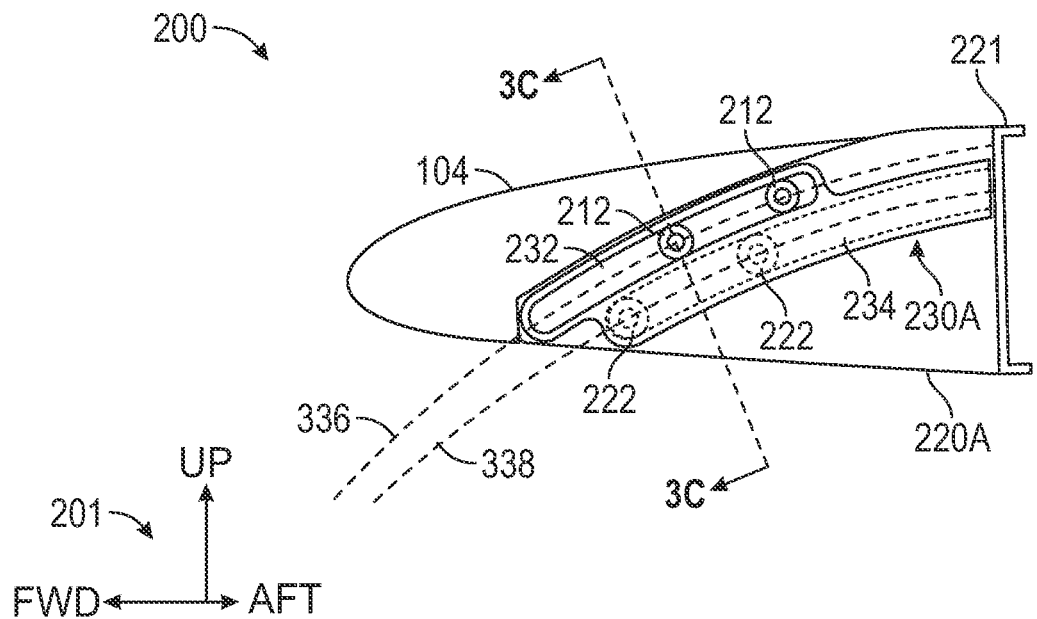
FIGS. 3A and 3B depict side plan views of an aerodynamic surface actuation system from FIG. 2 in a fully retracted and a fully extended position, respectively, according to another example of the present disclosure.
Figure 3B:
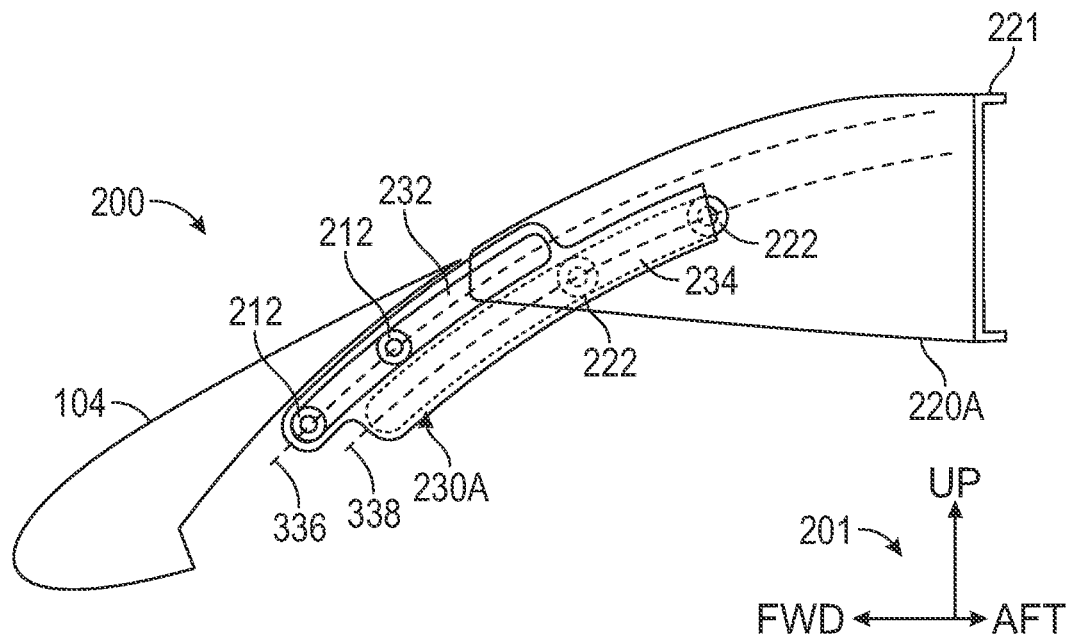

FIGS. 3A and 3B depict side plan views of an aerodynamic surface actuation system 200 in a fully retracted (FIG. 3A) and a fully extended (FIG. 3B) position, respectively, according to another example of the present disclosure. In particular, FIGS. 3A and 3B show how the system 200 moves as the aerodynamic surface is extended and retracted. Only certain aspects of the system 200 are shown for illustrative purposes. For example, the carrier 210 and the outer track 230B are not shown.

An actuator (not shown) may be used to control a position of the slat 104 and/or the outer track 230A. As the slat 104 extends to the fully extended position shown in FIG. 3B, both the slat 104 and the outer track 230A move away from the wing spar 221. The slat 104 and the outer track 230A move towards the wing spar 221 when the slat 104 retracts to the fully retracted position shown FIG. 3A. In the depicted embodiment, the actuator moves the outer track 230A between a plurality of set positions. The plurality of set positions comprises a fully extended position, a fully retracted position, and positions in between the fully extended and fully retracted positions. In other embodiments, the curvilinear path may be a linear path or another design.

As the slat 104 and the carrier 210 moves, the rollers 212 of the carrier 210 interface with the inner roller channel 232 of the outer track 230A. For example, as the actuator moves the slat 104 and the carrier 210 in the forward direction, the rollers 212 move forward in the inner roller channel 232. The outer roller channel 234 of the outer track 230A moves around the fixed rollers 222 of the first rib 220A. The fixed rollers 222 guide the outer track 230A as it moves. The outer roller channel 234 and the fixed rollers 222 are shown as dashed in FIGS. 3A and 3B because they are hidden from view.

The inner roller channel 232 and the outer roller channel 234 of the outer track 230A each generally define a curvilinear path 336 and 338, respectively. The extension of the outer track 230A effectively extends a length of the inner roller channel 232 as the inner roller channel 232 moves with the outer track 230A along the curvilinear path 336. This beneficially allows the slat 104 to be extended a distance in the forward direction that is longer than the length of the inner roller channel 232.

In some embodiments, the slat 104 and the outer track 230A may move in unison or independent of one another. For example, the slat 104 may be extended while the outer tracks 230 remain fixed. Alternatively, the outer tracks 230 may be extended while the rollers 212, carrier 210, and slat 104 remain fixed in relation to the outer tracks 230.

Although the description of how the system 200 is actuated, as described in relation to FIGS. 3A and 3B, is regarding the outer track 230A and the first rib 220A, the same description applies to the outer track 230B and the second rib 220B (as shown in FIG. 4). For example, the outer track 230B extends and retracts with the outer track 230A, and the outer roller channel 234 of the outer track 230B moves around the fixed rollers 222 of the second rib 220B. The outer tracks 230A and 230B work together and beneficially increase the stability of the system 200 as the system is actuated. The two tracks further ensure the system 200 is evenly loaded.

As shown in FIG. 3A, when the system 200 is in the fully retracted position, no part of the system 200 extends beyond the wing spar 221. Thus, the aerodynamic surface actuation system 200 fits entirely within a volume created by the ribs 220, the wing spar 221, and the slats 104. This beneficially avoids the need for local penetrations in the wing spar 221.

Some embodiments of the system 200 further include a position sensor such as an encoder or angular sensor to sense a position or angle of the outer tracks 230 or of the aerodynamic surface. The position sensor may be part of the actuator or mounted a part of the system 200. In some embodiments, the position sensor may interface with a system controller to control the actuator or such as described in relation to FIG. 7. For example, the system controller may control the position or rotation of the actuator using data from the position sensor.

Figure 3C:
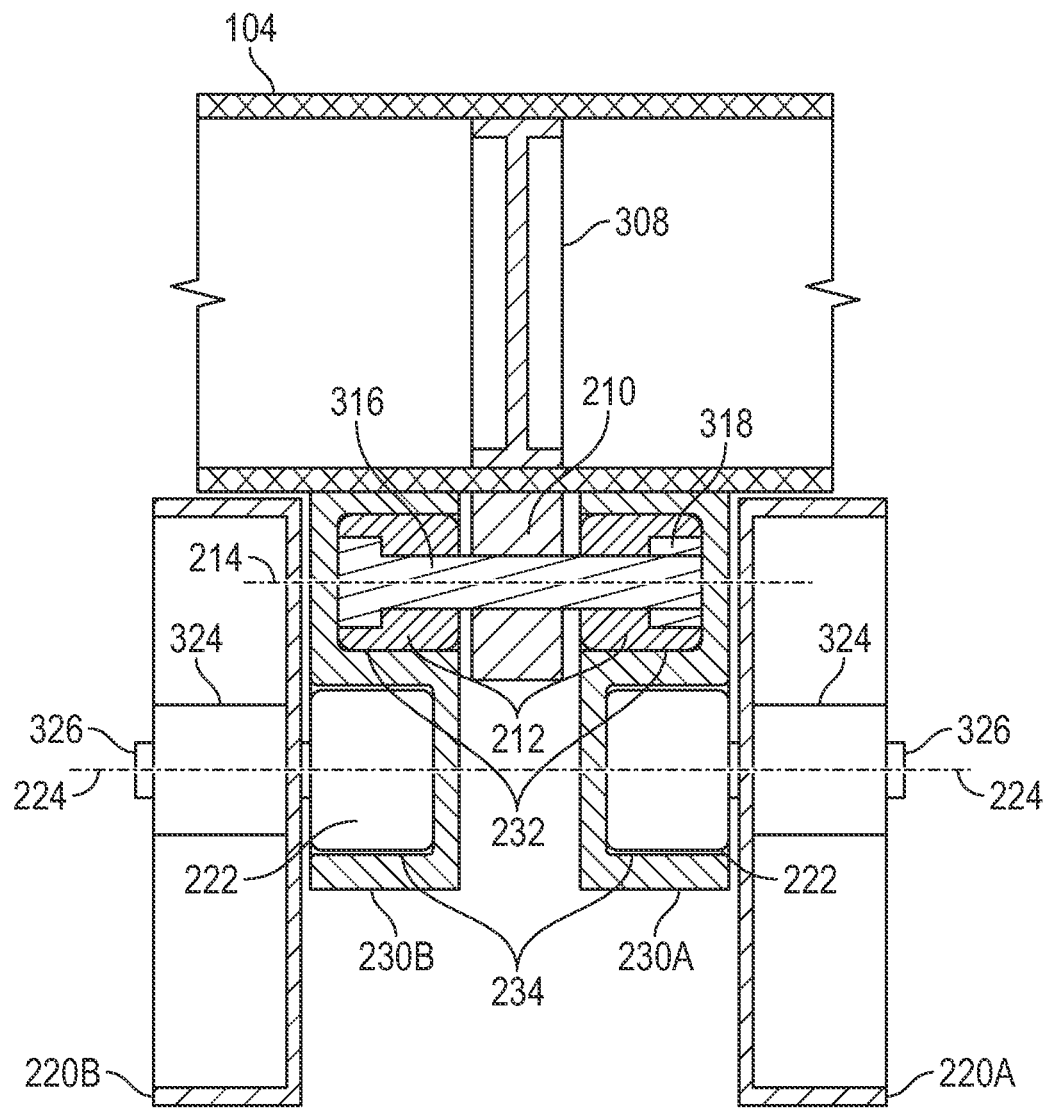
FIG. 3C depicts a cross-sectional view of an aerodynamic surface actuation system according to the example embodiment from FIG. 3A of the present disclosure.
Figure 3C:
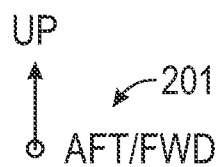
Figure 4:
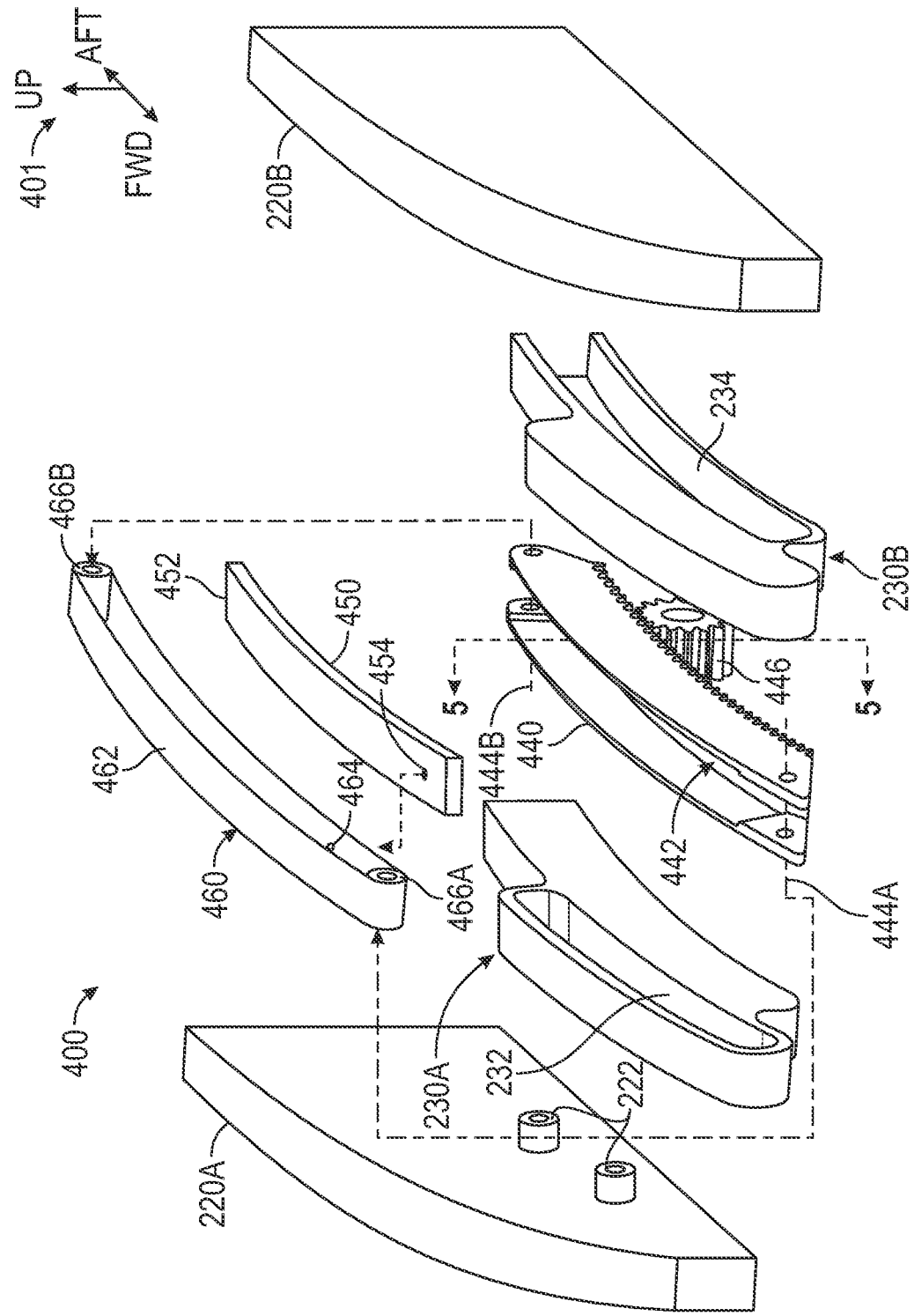
FIG. 4 depicts an exploded isometric view of a different aerodynamic surface actuation system, according to another example of the present disclosure.

FIG. 3C depicts a cross-sectional view of an aerodynamic surface actuation system according to the example embodiment from FIG. 3A of the present disclosure. In particular, FIG. 3C shows a cross-sectional slice of the aerodynamic surface actuation system 200 and does not show features beyond the perspective of the slice (e.g., the curved projection of the outer tracks 230 as they extend toward the forward end as shown in FIGS. 3A and 3B).

As shown, the system 200 is generally symmetrical about the carrier 210. For example, the rollers 212 are disposed on each side of the carrier 210 (e.g., left and right on the page) and connect to the carrier through a bolt 316 and a nut 318. The second rib 220B mirrors the first rib 220A and includes the fixed rollers 222, which attach to the ribs 220 through bolts 326. Each rib 220 comprises a protrusion 324 and the bolts 326 are disposed in each protrusion 324. The protrusions 324 are configured to transfer a load to the ribs 220 from the fixed rollers 222. The slat 104 includes a slat rib 308 and the carrier 210 connects to the slat 104 through the slat rib 308. In some embodiments, the carrier 210 and the slat rib 308 are a unitary body. As further shown, the outer tracks 230A and 230B comprise an S-shaped cross-section. The rollers 212 and 222 are disposed within the channels 232 and 234, respectively, of the outer tracks 230.

Although different means of connection are discussed in relation to FIG. 3C, they are not meant to be limiting. For example, different types of fasteners, rivets, welding, and adhesives and the like may be used to connect various elements. In some embodiments, the rollers 212 and 222 are installed with additional hardware, such as bearings, lock nuts, spacers, washers including lock washers, and threadlocker and the like.

FIG. 4 depicts an exploded isometric view of a different aerodynamic surface actuation system 400, according to another example of the present disclosure. The aerodynamic surface actuation system 400 (referred to as the system 400) is similar to the system 200, except as noted, and includes additional components. Additionally, some components of the system 400 are not shown in FIG. 4, such as the slat 104, and are discussed in relation to FIGS. 5A and 5B.

The system 400 includes the outer tracks 230, which function as described in relation to the system 200. The outer tracks 230 are configured to extend and retract the slat 104 when the system 200 is actuated. A rack gear 440 is disposed between and connected with the outer tracks 230. Generally, the outer tracks 230 coordinate with the rack gear 440 to provide a controllable movement of an aerodynamic surface between set positions. In particular, a pinion gear 446 is configured to interface with the rack gear 440 and cause the rack gear to move forward and backward. The rack gear 440 in turn causes the outer tracks 230 to move forward and backward. Thus, the rack gear 440 and the pinion gear 446 form a rack and pinion mechanism configured to move the outer tracks 230.

A belt assembly 460 is disposed within a channel 442 of the rack gear 440 and moves with the rack gear 440. The belt assembly 460 comprises a forward roller 466A, an aft roller 466B, and a belt 462 running continuously around the forward roller 466A and the aft roller 466B. The forward roller 466A and aft roller 466B are disposed on a rack forward axis 444A and a rack aft axis 444B, respectively. The belt assembly 460 connects to a carrier (not shown) that further connects to the slat 104 (not shown) as discussed in relation to FIGS. 5A and 5B. For example, the belt 462 of the belt assembly 460 connects to the carrier.

Figure 5A:
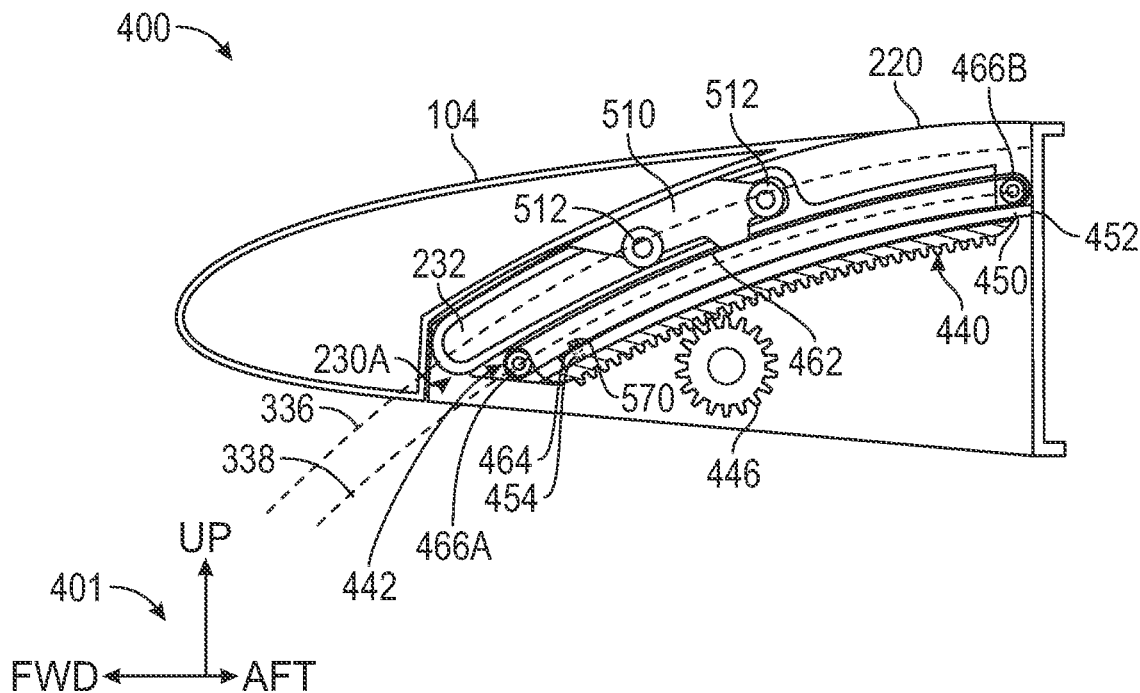
FIGS. 5A and 5B depict side plan views of the aerodynamic surface actuation system from FIG. 4 in a fully retracted and a fully extended position, respectively, according to another example of the present disclosure.
Figure 5B:
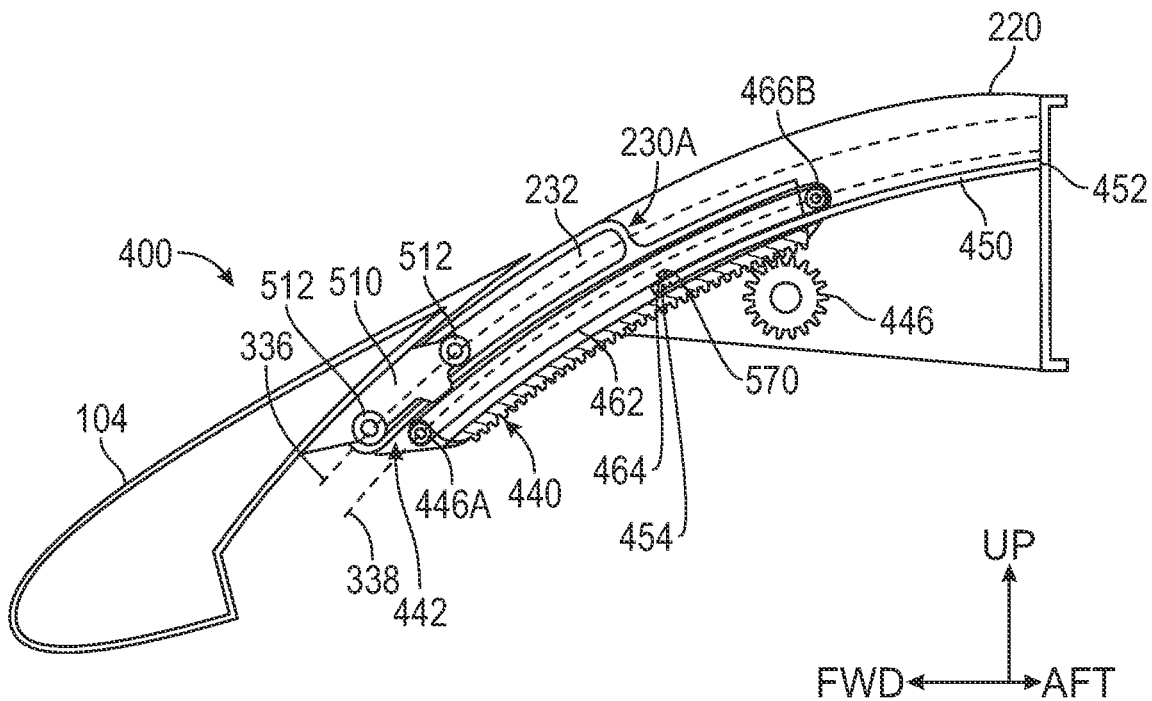

The rack gear 440 may connect with the outer tracks 230 through different means. As shown in FIGS. 5A and 5B, the rollers 466 of the rack gear 440 are positioned at a forward and an aft end of the outer tracks 230. In particular, the outer roller channel 234 of each outer track 230 is disposed in between the rollers 466. Interface hardware, such as shafts, nuts, and bolts; extend along the rack axes 444 and outward from the rack gear 440. The interface hardware is configured to contact the outer tracks 230 when the rack gear 440 moves forward and backward, which in turn moves the outer tracks 230 forward and backward. In some embodiments, the rack gear 440 is mounted to the outer tracks 230. For example, the rack gear 440 is bolted or adhered to the outer tracks 230.

The system further includes a reaction link 450 configured to engage the belt 462 of the belt assembly 460 when the system 400 is actuated. The reaction link 450 disposed within the channel 442 of the rack gear 440 and connected to a transverse structural element in the aerodynamic structure such as the wing spar 221 as discussed in relation to FIGS. 5A and 5B. The reaction link 450 is disposed between the channel 442 and the belt assembly 460. An aft end 452 of the reaction link 450, as shown in relation to a coordinate system 401, connects to the transverse structural element. The belt 462 connects to the reaction link 450 through a belt connection point 464 on the belt 462 and a respective link connection point 454 on the reaction link 450. For example, as shown in FIGS. 5A and 5B, the connection points 454 and 464 are coupled through a bolt 570 that threads into the reaction link 450. The connection points 454 and 464 and the reaction link 450 are configured to move the belt 462 when the rack gear 440 moves forward and backward as discussed in discussed in relation to FIGS. 5A and 5B. The reaction link 450 is generally loaded in a lateral direction (e.g., a forward and aft direction) as the rack gear 440 moves forward and backward and the belt 462 pulls and pushes on the reaction link 450 through the connection points 454 and 464. The rollers 466A and 466B are configured to rotate about the axes 444A and 444B, respectively, when the belt 462 is moved.

The system 400 is used to move the carrier and the slat 104 in a forward and aft direction as shown in relation to the coordinate system 401. The interface of the belt assembly 460, the rack gear 440, and the reaction link 450 of the system 400 offer several advantages over alternative actuation systems such as cable-driven, chain-driven, and direct drive actuation systems. For example, the belt 462 and the rollers 466 may be more compact, stronger, more reliable, less noisy, and require less maintenance than the alternative actuation systems. The belt assembly 460 is simpler and has less components than a complex cable-driven system, and may not require lubrication and cleaning like a chain-driven system. The belt assembly 460 and rack gear 440 further provide a smooth and stable mechanism for forward and reverse (e.g., the aft direction) motion without the need for large actuators such as in a direct drive system.

In some embodiments, the connection points 464 and 454 connect to the reaction link 450 through different mounting hardware or through an adhesive. In some embodiments, the belt 462 does not run continuously and has two ends. Each end connects to the reaction link 450 at separate belt connection points. The belt connection points may be located near another. For example, the belt connection points may both be at a forward end of the reaction link 450. In some embodiments, the transverse structural elements include longitudinal stringers, bulkheads, longerons, and formers and the like.

FIGS. 5A and 5B depict side plan views of the aerodynamic surface actuation system 400 in a fully retracted (FIG. 5A) and a fully extended (FIG. 5B) position, respectively, according to another example of the present disclosure. In particular, FIGS. 5A and 5B show how the system 400 moves as the aerodynamic surface is extended and retracted. Only certain aspects of the system 400 are shown for illustrative purposes. For example, the outer track 230B and second rib 220B are not shown.

As the system 400 is actuated, the outer tracks 230 extend and retract the slat 104 between various positions. The channels 232 and 234 of the outer tracks 230 are used by a carrier 510 and the pinion gear 446 to actuate the system 400. An actuator (not shown) rotates the pinion gear 446 and the pinion gear 446 operationally engages the rack gear 440. The pinion gear 446 moves the rack gear 440 in a forward and backward (e.g., aft as shown in the coordinate system 401) direction. The outer roller channel 234 of the outer track 230A moves around the fixed rollers 222 of the first rib 220A. Although not shown in FIGS. 5A and 5B, the outer roller channel 234 and the fixed rollers 222 are shown in FIG. 4. The fixed rollers 222 guide the outer track 230A as it moves forward and backward.

The slat 104 is actuated by the belt assembly 460 through the carrier 510. The carrier 510 is similar to the carrier 210 described in relation to FIGS. 2-3C, except as noted. As the rack gear 440 moves, the belt connection point 464 remains fixed to the link connection point 454 of the reaction link 450, which is fixed in relation to the wing spar 221. For example, when the slat 104 is extended, the reaction link 450 remains fixed to the wing spar 221 as the outer track 230A and the rack gear 440 move away from the wing spar 221. The fixed connection points 454 and 464 pull the belt around the rollers 466 as the rack gear 440 extends away from the wing spar 221. The carrier 510 moves with the belt 462 and extends the slat 104. As the carrier 510 and the belt 462 move, the rollers 512 of the carrier 510 move through the inner roller channel 232 of the outer track 230A. The rollers 212 guide the carrier 510 and the slat 104 as the belt 462 moves about the rollers 466 of the belt assembly 460. Thus, movement of the slat 104 is linked to movement of the rack gear 440 through the reaction link 450. For example, as the actuator rotates the pinion gear 446 counter-clockwise (as shown), the slat 104 moves away from the wing spar 221. As the actuator rotates the pinion gear 446 clockwise (as shown), the slat 104 moves toward the wing spar 221.

As discussed in relation to FIGS. 3A and 3B, the channels 232 and 234 of the outer track 230A each generally define a curvilinear path 336 and 338, respectively. The extension of the outer track 230A effectively extends a length of the inner roller channel 232 as the inner roller channel 232 moves with the outer track 230A along the curvilinear path 336. This beneficially allows the slat 104 to be extended a distance in the forward direction that is longer than the length of the inner roller channel 232.

Although not shown, the actuator may comprise a motor, torque tube, or other controllable rotating element that causes the pinon gear 446 to rotate. Although the description of how the system 400 is actuated, as described in relation to FIGS. 5A and 5B, is regarding the outer track 230A and the first rib 220A, the same description applies to the outer track 230B and the second rib 220B (as shown in FIG. 4). For example, the outer track 230B extends and retracts with the outer track 230A, and the outer roller channel 234 of the outer track 230B moves around the fixed rollers 222 of the second rib 220B. The outer tracks 230A and 230B work together and beneficially increase the stability of the system 200 as the system is actuated. The two tracks further ensure the system 200 is evenly loaded.

As shown in FIG. 5A, no part of the system 400 extends beyond the wing spar 221 when the system 400 is in the fully retracted position. Thus, the system 400 fits entirely within a volume created by the ribs 220, the wing spar 221, and the slats 104, which avoids the need for local penetrations in the wing spar 221.

Figure 7:
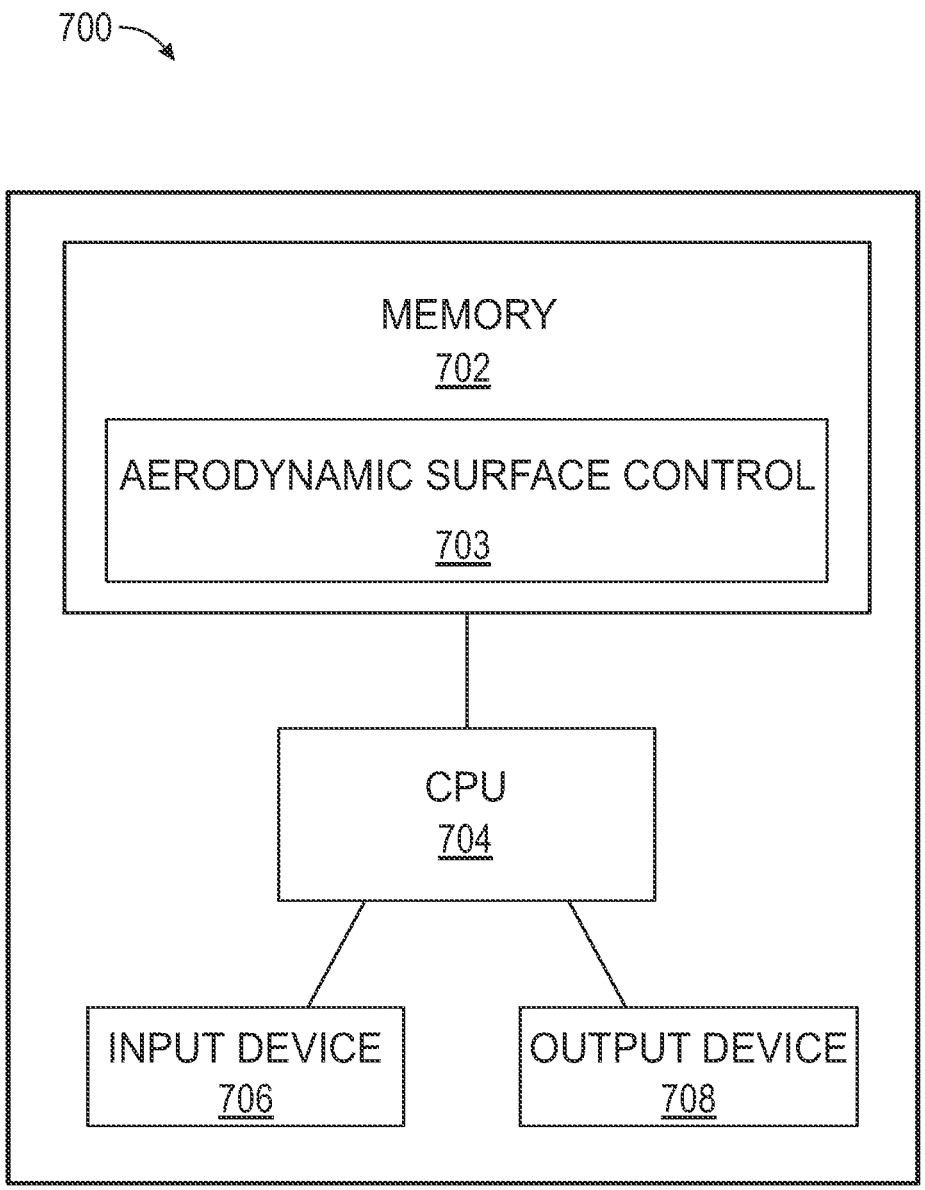
FIG. 7 depicts a schematic view of an example system controller that can be used according to the systems and methods described herein.

Some embodiments of the system 400 further include a position sensor and/or system controller to sense the position of the slat 104 and control the actuator or such as described in relation to FIGS. 3A-3B and 7.

Examples of Methods for Positioning an Aerodynamic Surface

Figure 6:
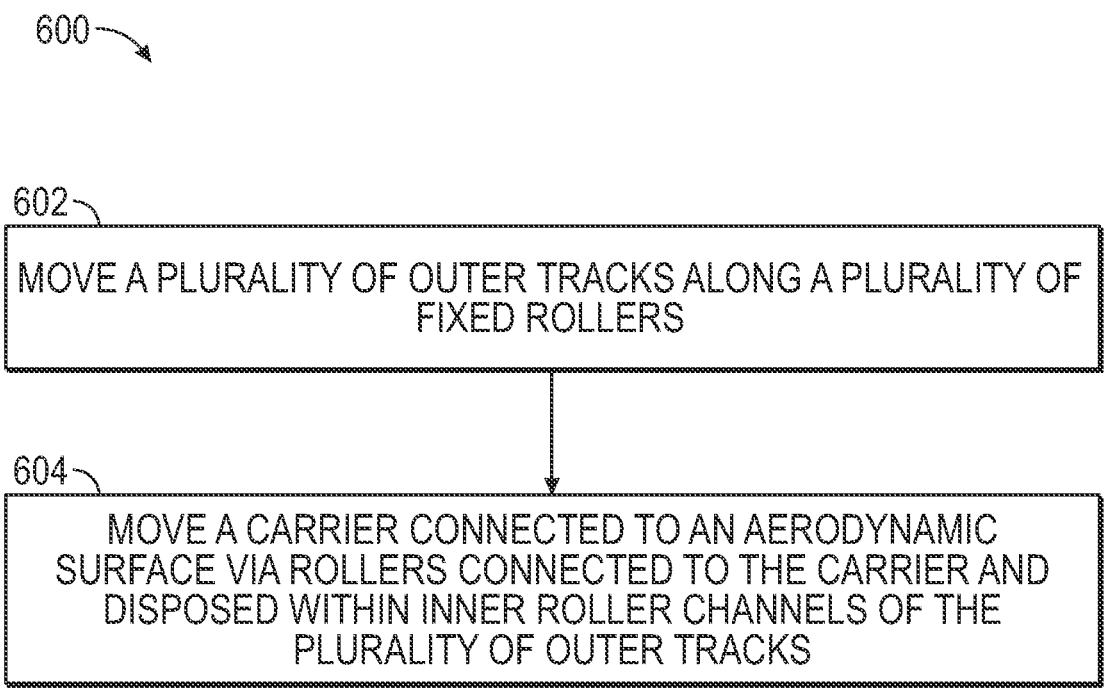
FIG. 6 depicts an example method of controlling a position of an aerodynamic surface using an aerodynamic surface actuation system.

FIG. 6 depicts an example method 600 of controlling the position of an aerodynamic surface using an aerodynamic surface actuation system, according to another example of the present disclosure.

Method 600 begins at step 602 with moving a plurality of outer tracks along a plurality of fixed rollers, wherein each outer track of the plurality of outer tracks comprises an outer roller channel and an inner roller channel positioned above the outer roller channel, as described above with respect to FIGS. 2-5B. The plurality of fixed rollers are connected to one or more longitudinal structural elements in an aerodynamic structure and disposed within outer roller channels of the plurality of outer tracks.

Method 600 then proceeds to step 604 with moving a carrier connected to an aerodynamic surface via rollers connected to the carrier and disposed within inner roller channels of the plurality of outer tracks, as described above with respect to FIGS. 2-5B.

In some embodiments of method 600, moving the carrier connected to the aerodynamic surface further comprises rotating a pinion gear to cause a rack gear connected with the plurality of outer tracks to move, as described above with respect to FIGS. 4-5B. In some embodiments, moving the carrier connected to the aerodynamic surface further comprises rotating a belt assembly disposed within a channel of the rack gear and connected to the carrier. In some embodiments, the belt assembly comprises a forward roller, an aft roller, and a belt running continuously around the forward roller and aft roller. In some embodiments, the belt assembly further comprises a reaction link disposed within the channel of the rack gear and connected to a transverse structural element in the aerodynamic structure.

In some embodiments, moving the carrier connected to the aerodynamic surface further comprises operating an actuator configured to rotate the pinion gear in a first direction to cause the aerodynamic surface to move away from the aerodynamic structure, and configured to rotate the pinion gear in a second direction to cause the aerodynamic surface to move toward the aerodynamic structure, as described above with respect to FIGS. 4-5B. Some embodiments further include fully retracting a position of the aerodynamic surface without any of the outer tracks or the rack gear extending beyond the spar of the aircraft wing.

In some embodiments, the aerodynamic structure is an aircraft wing and the aerodynamic surface is a slat of the aircraft wing, as described above with respect to FIGS. 1A and 2-5B.

In some embodiments, the aerodynamic structure is an aircraft wing and the aerodynamic surface is a flap of the aircraft wing, as described above with respect to FIGS. 1A and 2.

In some embodiments, the one or more longitudinal structural elements comprise ribs of the aircraft wing and the transverse structure element comprises a spar of the aircraft wing, as described above with respect to FIGS. 3A-3B and 5A-5B.

In some embodiments of method 600, the inner roller channel and outer roller channel of each outer track generally define curvilinear paths, as described above with respect to FIGS. 2-5B.

Note that FIG. 6 is just one example of a method, and other methods including fewer, additional, or alternative steps are possible consistent with this disclosure.

Example Processing System

FIG. 7 depicts a schematic view of an example system controller 700 that can be used according to the systems and methods described herein. The system controller 700 includes a processor 704 (e.g., a central processing unit (CPU)) in data communication with a memory 702, an input device 706, and an output device 708. Although described separately, it is to be appreciated that functional blocks described with respect to the system controller 700 need not be separate structural elements. For example, the processor 704 and memory 702 is embodied in a single chip. The processor 704 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 704 can be coupled, via one or more buses, to read information from or write information to memory 702. The processor may additionally, or in the alternative, contain memory, such as processor registers. The memory 702 can include processor cache, including a multi-level hierarchical cache in which different levels have different capacities and access speeds. The memory 702 can also include random access memory (RAM), other volatile storage devices, or non-volatile storage devices. The storage can include hard drives, flash memory, etc. Memory 702 can also include a computer program product embodied on memory 702 comprising code such as an aerodynamic surface control application 703, which is used to control the actuator as described in FIGS. 2-3B and 4-5B. Aerodynamic surface control application 703 may be code that can be executed by processor 704. In various instances, the memory is referred to as a computer-readable storage medium or a non-transitory computer-readable medium. The computer-readable storage medium is a non-transitory device capable of storing information, and is distinguishable from computer-readable transmission media such as electronic transitory signals capable of carrying information from one location to another. The non-transitory computer readable medium includes computer-executable instructions that, when executed by a processing system, cause the processing system to perform a method, as described in relation to FIGS. 2-3B and 4-5B, including moving a plurality of outer tracks along a plurality of fixed rollers and moving a carrier connected to an aerodynamic surface via rollers connected to the carrier and disposed within inner roller channels of the plurality of outer tracks. Computer-readable medium as described herein may generally refer to a computer-readable storage medium or computer-readable transmission medium.

The processor 704 also may be coupled to an input device 706 and an output device 708 for, respectively, receiving input from and providing output to a user of the system controller 700. Suitable input devices include, but are not limited to a video camera (possibly coupled with video processing software to, e.g., detect a position of the middle track, the plurality of outer tracks, or the aerodynamic surface), an encoder (e.g., an optical or magnetic, capacitive, or inductive encoder), a resolver, a potentiometer, an angle sensor, an accelerometer, a gyroscope, an inertial measurement unit, or a motion detector. The input device 706 includes a position sensor such as an encoder or angle position sensor as discussed in relation to FIGS. 3A-3B and 5A-5B. Suitable output devices include, but are not limited to, the actuator as discussed in relation to FIGS. 2-3B and 4-6.

Aspects of the present disclosure have been described above with reference to specific embodiments. Persons skilled in the art, however, will understand that various modifications and changes may be made thereto without departing from the broader spirit and scope of the present disclosure as set forth in the appended claims. The foregoing description and drawings are, accordingly, to be regarded in an illustrative rather than a restrictive sense.

EXAMPLE CLAUSES

Implementation examples are described in the following numbered clauses:

Clause 1. An aerodynamic surface actuation system, comprising a plurality of outer tracks, wherein each outer track of the plurality of outer tracks comprises an inner outer roller channel; and an outer inner roller channel positioned above the inner outer roller channel; an aerodynamic surface connected to a carrier, wherein the carrier comprises rollers configured to move within inboard inner roller channels of the plurality of outer tracks; and a plurality of fixed rollers mounted to one or more longitudinal structural elements in an aerodynamic structure, wherein the plurality of fixed rollers are disposed within the outer roller channels of the plurality of outer tracks.

Clause 2. The aerodynamic surface actuation system of Clause 1, further comprising a rack gear connected with the plurality of outer tracks; and a pinion gear configured to interface with the rack gear and cause the rack gear to move forward and backward.

Clause 3. The aerodynamic surface actuation system of Clause 2, further comprising a belt assembly disposed within a channel of the rack gear and connected to the carrier.

Clause 4. The aerodynamic surface actuation system of Clause 3, wherein the belt assembly comprises a forward roller; an aft roller; and a belt running continuously around the forward roller and the aft roller, wherein the belt is connected to the carrier.

Clause 5. The aerodynamic surface actuation system of Clause 4, further comprising a reaction link disposed within the channel of the rack gear and connected to a transverse structural element in the aerodynamic structure.

Clause 6. The aerodynamic surface actuation system of Clause 5, wherein the aerodynamic structure is an aircraft wing, and the aerodynamic surface is a slat.

Clause 7. The aerodynamic surface actuation system of Clause 6, wherein the one or more longitudinal structural elements comprise ribs of the aircraft wing, and the transverse structure element comprises a spar of the aircraft wing.

Clause 8. The aerodynamic surface actuation system of Clause 7, further comprising an actuator configured to rotate the pinion gear in a first direction to cause the aerodynamic surface to move away from the aerodynamic structure, and configured to rotate the pinion gear in a second direction to cause the aerodynamic surface to move toward the aerodynamic structure.

Clause 9. The aerodynamic surface actuation system of Clause 7, wherein when in a fully retracted position, no part of the aerodynamic surface actuation system penetrates extends beyond the wing spar.

Clause 10. The aerodynamic surface actuation system of any one of Clauses 1-9, wherein the inner roller channel and outer roller channel of each outer track generally define curvilinear paths.

Clause 11. A method of actuating an aerodynamic surface, comprising moving a plurality of outer tracks along a plurality of fixed rollers, wherein each outer track of the plurality of outer tracks comprises an outer roller channel; and an inner roller channel positioned above the outer roller channel, and the plurality of fixed rollers are connected to one or more longitudinal structural elements in an aerodynamic structure and disposed within outer roller channels of the plurality of outer tracks; and moving a carrier connected to an aerodynamic surface via rollers connected to the carrier and disposed within inner roller channels of the plurality of outer tracks.

Clause 12. The method of Clause 11, wherein moving the carrier connected to the aerodynamic surface further comprises rotating a pinion gear to cause a rack gear connected with the plurality of outer tracks to move.

Clause 13. The method of Clause 12, wherein moving the carrier connected to the aerodynamic surface further comprises rotating a belt assembly disposed within a channel of the rack gear and connected to the carrier.

Clause 14. The method of Clause 13, wherein the belt assembly comprises a forward roller; an aft roller; and a belt running continuously around the forward roller and aft roller.

Clause 15. The method of Clause 14, wherein the belt assembly further comprises a reaction link disposed within the channel of the rack gear and connected to a transverse structural element in the aerodynamic structure.

Clause 16. The method of Clause 15, wherein the aerodynamic structure is an aircraft wing, and the aerodynamic surface is a slat.

Clause 17. The method of Clause 16, wherein the one or more longitudinal structural elements comprise ribs of the aircraft wing, and the transverse structure element comprises a spar of the aircraft wing.

Clause 18. The method of Clause 17, wherein moving the carrier connected to the aerodynamic surface further comprises operating an actuator configured to rotate the pinion gear in a first direction to cause the aerodynamic surface to move away from the aerodynamic structure, and configured to rotate the pinion gear in a second direction to cause the aerodynamic surface to move toward the aerodynamic structure.

Clause 19. The method of Clause 17, further comprising fully retracting a position of the aerodynamic surface without any of the outer tracks or the rack gear extending beyond the spar of the aircraft wing.

Clause 20. The aerodynamic surface actuation system of any one of Clauses 11-19, wherein the inner roller channel and outer roller channel of each outer track generally define curvilinear paths.

Clause 21. A processing system, comprising a memory comprising computer-executable instructions; and one or more processors configured to execute the computer-executable instructions and cause the processing system to perform a method in accordance with any one of Clauses 11-20.

Clause 22. A processing system, comprising means for performing a method in accordance with any one of Clauses 11-20.

Clause 23. A non-transitory computer-readable medium comprising computer-executable instructions that, when executed by one or more processors of a processing system, cause the processing system to perform a method in accordance with any one of Clauses 11-20.

Clause 24. A computer program product embodied on a computer-readable storage medium comprising code for performing a method in accordance with any one of Clauses 11-20.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An aerodynamic surface actuation system, comprising:
   a plurality of outer tracks, wherein each outer track of the plurality of outer tracks comprises:
      an outer roller channel; and
      an inner roller channel positioned above the outer roller channel;
   an aerodynamic surface connected to a carrier, wherein the carrier comprises rollers configured to move within inner roller channels of the plurality of outer tracks; and
   a plurality of fixed rollers mounted to one or more longitudinal structural elements in an aerodynamic structure, wherein the plurality of fixed rollers are disposed within the outer roller channels of the plurality of outer tracks.

2. The aerodynamic surface actuation system of claim 1, further comprising:
   a rack gear connected with the plurality of outer tracks; and
   a pinion gear configured to interface with the rack gear and cause the rack gear to move forward and backward.

3. The aerodynamic surface actuation system of claim 2, further comprising a belt assembly disposed within a channel of the rack gear and connected to the carrier.

4. The aerodynamic surface actuation system of claim 3, wherein the belt assembly comprises:
   a forward roller;
   an aft roller; and
   a belt running continuously around the forward roller and the aft roller,
   wherein the belt is connected to the carrier.

5. The aerodynamic surface actuation system of claim 4, further comprising a reaction link disposed within the channel of the rack gear and connected to a transverse structural element in the aerodynamic structure.

6. The aerodynamic surface actuation system of claim 5, wherein:
   the aerodynamic structure is an aircraft wing, and
   the aerodynamic surface is a slat.

7. The aerodynamic surface actuation system of claim 6, wherein:

the one or more longitudinal structural elements comprise ribs of the aircraft wing, and the transverse structure element comprises a spar of the aircraft wing.

8. The aerodynamic surface actuation system of claim 7, further comprising an actuator configured to rotate the pinion gear in a first direction to cause the aerodynamic surface to move away from the aerodynamic structure, and configured to rotate the pinion gear in a second direction to cause the aerodynamic surface to move toward the aerodynamic structure.

9. The aerodynamic surface actuation system of claim 7, wherein when in a fully retracted position, no part of the aerodynamic surface actuation system extends beyond the spar of the aircraft wing.

10. The aerodynamic surface actuation system of claim 1, wherein the inner roller channel and outer roller channel of each outer track generally define curvilinear paths.

11. A method of actuating an aerodynamic surface, comprising:

moving a plurality of outer tracks along a plurality of fixed rollers, wherein:

each outer track of the plurality of outer tracks comprises:

an outer roller channel; and an inner roller channel positioned above the outer roller channel, and the plurality of fixed rollers are connected to one or more longitudinal structural elements in an aerodynamic structure and disposed within outer roller channels of the plurality of outer tracks; and moving a carrier connected to an aerodynamic surface via rollers connected to the carrier and disposed within inner roller channels of the plurality of outer tracks.

12. The method of claim 11, wherein moving the carrier connected to the aerodynamic surface further comprises rotating a pinion gear to cause a rack gear connected with the plurality of outer tracks to move.

13. The method of claim 12, wherein moving the carrier connected to the aerodynamic surface further comprises rotating a belt assembly disposed within a channel of the rack gear and connected to the carrier.

14. The method of claim 13, wherein the belt assembly comprises:

a forward roller;

an aft roller; and a belt running continuously around the forward roller and aft roller.

15. The method of claim 14, wherein the belt assembly further comprises a reaction link disposed within the channel of the rack gear and connected to a transverse structural element in the aerodynamic structure.

16. The method of claim 15, wherein:

the aerodynamic structure is an aircraft wing, and the aerodynamic surface is a slat.

17. The method of claim 16, wherein:

the one or more longitudinal structural elements comprise ribs of the aircraft wing, and the transverse structure element comprises a spar of the aircraft wing.

18. The method of claim 17, wherein moving the carrier connected to the aerodynamic surface further comprises operating an actuator configured to rotate the pinion gear in a first direction to cause the aerodynamic surface to move away from the aerodynamic structure, and configured to rotate the pinion gear in a second direction to cause the aerodynamic surface to move toward the aerodynamic structure.

19. The method of claim 17, further comprising fully retracting a position of the aerodynamic surface without any of the outer tracks or the rack gear extending beyond the spar of the aircraft wing.

20. The method of claim 11, wherein the inner roller channel and outer roller channel of each outer track generally define curvilinear paths.

* * * * *